United States Patent
Rozen et al.

(10) Patent No.: US 12,536,168 B1
(45) Date of Patent: Jan. 27, 2026

(54) METHOD AND SYSTEM FOR CONVERTING FREE TEXT QUERIES TO KUSTO QUERY LANGUAGE (KQL) QUERIES

(71) Applicant: Vega Cyber Solutions LTD, Tel Aviv Yafo (IL)

(72) Inventors: Eli Rozen, Tel Aviv (IL); Gil Knafo, Tel Aviv (IL); Yarden Sasson, Ramat Gan (IL)

(73) Assignee: Vega Cyber Solutions LTD, Tel Aviv-Jaffa (IL)

( * ) Notice: Subject to any disclaimer, the term of this patent is extended or adjusted under 35 U.S.C. 154(b) by 0 days.

(21) Appl. No.: 19/224,046

(22) Filed: May 30, 2025

Related U.S. Application Data

(60) Provisional application No. 63/770,086, filed on Mar. 11, 2025.

(51) Int. Cl.
*G06F 16/2452* (2019.01)
*G06F 16/3329* (2025.01)
*G06F 16/334* (2025.01)

(52) U.S. Cl.
CPC .... *G06F 16/24522* (2019.01); *G06F 16/3329* (2019.01); *G06F 16/3347* (2019.01)

(58) Field of Classification Search
CPC ........... G06F 16/24522; G06F 16/3329; G06F 16/3347
See application file for complete search history.

(56) References Cited

U.S. PATENT DOCUMENTS

| | | | |
|---|---|---|---|
| 9,680,779 B2 | 6/2017 | Marovets | |
| 11,736,526 B2 | 8/2023 | Jeong | |
| 11,954,102 B1* | 4/2024 | Palaniappan | G06F 16/2237 |
| 2020/0120102 A1 | 4/2020 | Cybulski et al. | |
| 2022/0035775 A1 | 2/2022 | Sriharsha et al. | |
| 2023/0291743 A1 | 9/2023 | Shua et al. | |
| 2024/0070270 A1* | 2/2024 | Mace | G06F 21/554 |
| 2024/0259435 A1 | 8/2024 | Giralte et al. | |
| 2024/0265913 A1 | 8/2024 | Laptev et al. | |
| 2024/0364712 A1 | 10/2024 | Chandana et al. | |

(Continued)

OTHER PUBLICATIONS

J. Yi, G. Chen and Z. Shen, "RH-SQL: Refined Schema and Hardness Prompt for Text-to-SQL,", 2024, 2024 6th International Conference on Electronic Engineering and Informatics (EEI), Chongqing, China, pp. 1340-1343 (Year: 2024).*

(Continued)

*Primary Examiner* — Eric Yen
(74) *Attorney, Agent, or Firm* — M&B IP Analysts LLC

(57) ABSTRACT

A system and method for querying data sources for cybersecurity analysis is presented. The method includes identifying, by a device, fields of security logs that are relevant to a natural language query; computing, by the device, values for the identified fields based on actual values contained in the identified fields; refining, by the device, a schema of the security logs to include the identified fields and the computed values; generating, based on at least the refined schema, a prompt for a Large Language Model (LLM), wherein the LLM is executed by an AI system; feeding the prompt to the LLM, wherein the LLM executes the prompt using the AI system, to convert the natural language query into a Kusto Query Language (KQL) query; and generating a KQL query that is executed on at least one target data source.

21 Claims, 5 Drawing Sheets

(56) References Cited

U.S. PATENT DOCUMENTS

| | | | |
|---|---|---|---|
| 2024/0419803 A1* | 12/2024 | Blum | G06F 21/577 |
| 2025/0028746 A1* | 1/2025 | Cantu | G06F 16/3329 |
| 2025/0086308 A1* | 3/2025 | Crume | G06N 5/025 |
| 2025/0156384 A1 | 5/2025 | Rajagopalan et al. | |
| 2025/0217346 A1 | 7/2025 | Black et al. | |
| 2025/0245446 A1* | 7/2025 | Ayed | G06F 8/35 |
| 2025/0247400 A1 | 7/2025 | Verma | |

OTHER PUBLICATIONS

Tang, X., Abdi, A. H., Eichelbaum, J., Das, M., Klein, A., Pakis, N. I., Blum, W., Mace, D. L., Raja, T., Padmanabhan, N., & Xing, Y. (2024). NL2KQL: From natural language to kusto query. In arXiv [cs.DB]. http://arxiv.org/abs/2404.02933.

2025 3rd International Conference on Self Sustainable Artificial Intelligence Systems (ICSSAS)Year: 2025 | Conference Paper | Publisher: IEEENarang et al., "Project Pulse: A Scalable, Secure, and Smart Project Management Platform on AWS,".

Ji et al., "Leveraging Large Language Model for Intelligent Log Processing and Autonomous Debugging in Cloud AI Platforms," 2025 8th International Conference on Advanced Electronic Materials, Computers and Software Engineering (AEMCSE) Year: 2025 | Conference Paper | Publisher: IEEE.

\* cited by examiner

METHOD AND SYSTEM FOR CONVERTING FREE TEXT QUERIES TO KUSTO QUERY LANGUAGE (KQL) QUERIES

CROSS-REFERENCE TO RELATED APPLICATIONS

This application claims the benefit of U.S. Provisional Application No. 63/770,086 filed on Mar. 11, 2025, the contents of which are hereby incorporated by reference.

TECHNICAL FIELD

The present disclosure relates generally to methods for converting natural language queries to KQL queries.

BACKGROUND

KQL is a powerful query language used in cybersecurity platforms for searching, analyzing, and visualizing log data. Many security analysts struggle with its syntax, leading to inefficiencies in data exploration. As such, writing Kusto Query Language (KQL) queries to analyze security logs can be challenging, especially for non-technical users or those unfamiliar with the language syntax.

For analysts lacking expertise in KQL, manually constructing queries is a time-intensive process. A Natural Language to KQL (NL2KQL) translation system may offer a solution by enabling users to query data with ease. However, existing solutions, including those leveraging standard large language models (LLMs), are inefficient due to inaccuracies arising from the inherent ambiguity of natural language. Additionally, these methods are resource-intensive, leading to increased processing time and computational overhead.

Another challenge in translating natural language to KQL is ensuring that the generated KQL is syntactically correct for execution within a KQL-based search engine. Additionally, the generated KQL query must not only be syntactically valid but also contextually relevant to the underlying log data, thereby facilitating meaningful and effective query generation.

A significant technical challenge arises from the inherently unstructured nature of logs, which often lack a predefined schema. In many cases, fields are not explicitly defined, nor are the fields' data types or potential values known in advance. This lack of structure complicates query generation and interpretation.

In real-world scenarios, certain data sources can be highly complex. For example, AWS CloudTrail® contains over one thousand unique fields, adding to the difficulty of effective log parsing and analysis. Moreover, some fields may have an unbounded number of possible values, further exacerbating the challenge of extracting meaningful insights in a scalable and efficient manner.

Additionally, existing NL2KQL tools are only operable on particular Kusto databases (e.g., databases associated with Microsoft Sentinel® and Microsoft Defender®) that contain a limited variety of data schema and do not provide an operable solution for generating, from natural language request, KQL queries that are performant on a wide variety of Kusto databases.

It would, therefore, be advantageous to provide a solution that will overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include identifying, by a device, fields of security logs that are relevant to a natural language query. The method may also include computing, by the device, values for the identified fields based on actual values contained in the identified fields. The method may furthermore include refining, by the device, a schema of the security logs to include the identified fields and the computed values. The method may in addition include generating, based on at least the refined schema, a prompt for a Large Language Model (LLM), where the LLM is executed by an AI system. The method may moreover include feeding the prompt to the LLM, where the LLM executes the prompt using the AI system, to convert the natural language query into a Kusto Query Language (KQL) query. The method may also include generating a KQL query that is executed on at least one target data source. Other embodiments of this aspect include corresponding computer systems, apparatus, and computer programs recorded on one or more computer storage devices, each configured to perform the actions of the methods.

Implementations may include one or more of the following features. The method may include: converting, using a text embedding model, the natural language query into a text embedding; and storing the text embedding representing the natural language query in a multi-dimensional feature space. The method where identifying fields of security logs that are relevant to the natural language query further may include: generating a natural language description of each field; embedding a feature vector for the natural language description of each field in a multi-dimensional feature space; performing a field vector similarity search between the feature vector representing the natural language query and each feature vector representing the natural language descriptions of each field; identifying at least one field for which the feature vector is below a semantic distance threshold from the feature vector representing the natural language query; and validating the at least one field against ground-truth pairs of natural language field descriptions and KQL-searchable fields for at least one target data source. The method where computing values for the identified fields based on actual values contained in the identified fields further may include: embedding a feature vector for the natural language description of each possible value of each field in a multi-dimensional feature space; performing a value vector similarity search between the feature vector representing the natural language query and each feature vector representing the natural language descriptions of each possible value of each field; identifying at least one value for which the feature vector is below a semantic distance threshold from the feature vector representing the natural language query; and validating the at least one value against ground-truth pairs of natural language value descriptions and actual values in the at least one target data source. The method where generating the natural language descriptions of the fields may include: generating the natural language descriptions using an AI-based search engine, where the AI-based search engine gathers relevant information on the fields from official documentation and other available data sources. The method may include: validating the a syntax of the generated KQL query. The method where refining the schema of the logs based on the identified fields and identified values further may include: narrowing the schema to the most pertinent elements of the schema based on the identified fields and identified values. The method where the a vector similarity searches further may include: constructing a fields description vector database and a values vector database, where each vector database includes a multi-dimensional vector space of a relatively low dimensionality. The method where KQL is a language to query any one of: structured data, semi-structured data, and unstructured data. The method where a KQL query is a read-only request to process data stored hierarchically in databases, tables, and columns. Implementations of the described techniques may include hardware, a method or process, or a computer tangible medium.

In one general aspect, a non-transitory computer-readable medium may include one or more instructions that, when executed by one or more processing circuitries of a device, cause the device to: identify, by a device, fields of security logs that are relevant to a natural language query; compute, by the device, values for the identified fields based on actual values contained in the identified fields; refine, by the device, a schema of the security logs to include the identified fields and the computed values; generate, based on at least the refined schema, a prompt for a Large Language Model (LLM), where the LLM is executed by an AI system; feed the prompt to the LLM, where the LLM executes the prompt using the AI system, to convert the natural language query into a Kusto Query Language (KQL) query; and generate a KQL query that is executed on at least one target data source. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: identify, by a device, fields of security logs that are relevant to a natural language query. The system may in addition compute, by the device, values for the identified fields based on actual values contained in the identified fields. The system may moreover refine, by the device, a schema of the security logs to include the identified fields and the computed values. The system may also generate, based on at least the refined schema, a prompt for a Large Language Model (LLM), where the LLM is executed by an AI system. The system may furthermore feed the prompt to the LLM, where the LLM executes the prompt using the AI system, to convert the natural language query into a Kusto Query Language (KQL) query. The system may in addition generate a KQL query that is executed on at least one target data source. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: convert, using a text embedding model, the natural language query into a text embedding; and store the text embedding representing the natural language query in a multi-dimensional feature space. The system where the memory contains further instructions that, when executed by the processing circuitry for identifying fields of security logs that are relevant to the natural language query, further configure the system to: generate a natural language description of each field; embed a feature vector for the natural language description of each field in a multi-dimensional feature space; perform a field vector similarity search between the feature vector representing the natural language query and each feature vector representing the natural language descriptions of each field; identify at least one field for which the feature vector is below a semantic distance threshold from the feature vector representing the natural language query; and validate the at least one field against ground-truth pairs of natural language field descriptions and KQL-searchable fields for at least one target data source. The system where the memory contains further instructions that, when executed by the processing circuitry for computing values for the identified fields based on actual values contained in the identified fields, further configure the system to: embed a feature vector for the natural language description of each possible value of each field in a multi-dimensional feature space; perform a value vector similarity search between the feature vector representing the natural language query and each feature vector representing the natural language descriptions of each possible value of each field; identify at least one value for which the feature vector is below a semantic distance threshold from the feature vector representing the natural language query; and validate the at least one value against ground-truth pairs of natural language value descriptions and actual values in the at least one target data source. The system where the memory contains further instructions that, when executed by the processing circuitry for generating the natural language descriptions of the fields, further configure the system to: generate the natural language descriptions using an AI-based search engine, where the AI-based search engine gathers relevant information on the fields from official documentation and other available data sources. The system where the memory contains further instructions which when executed by the processing circuitry further configure the system to: validate the a syntax of the generated KQL query. The system where the memory contains further instructions that, when executed by the processing circuitry for refining the schema of the logs based on the identified fields and identified values, further configure the system to: narrow the schema to the most pertinent elements of the schema based on the identified fields and identified values. The system where the vector similarity searches further may include: constructing a field description vector database and a values vector database, where each vector database includes a multi-dimensional vector space of a relatively low-dimensionality. The system where KQL is a language to query any one of: structured data, semi-structured data, and unstructured data. The system where a KQL query is a read-only request to process data stored hierarchically in databases, tables, and columns. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
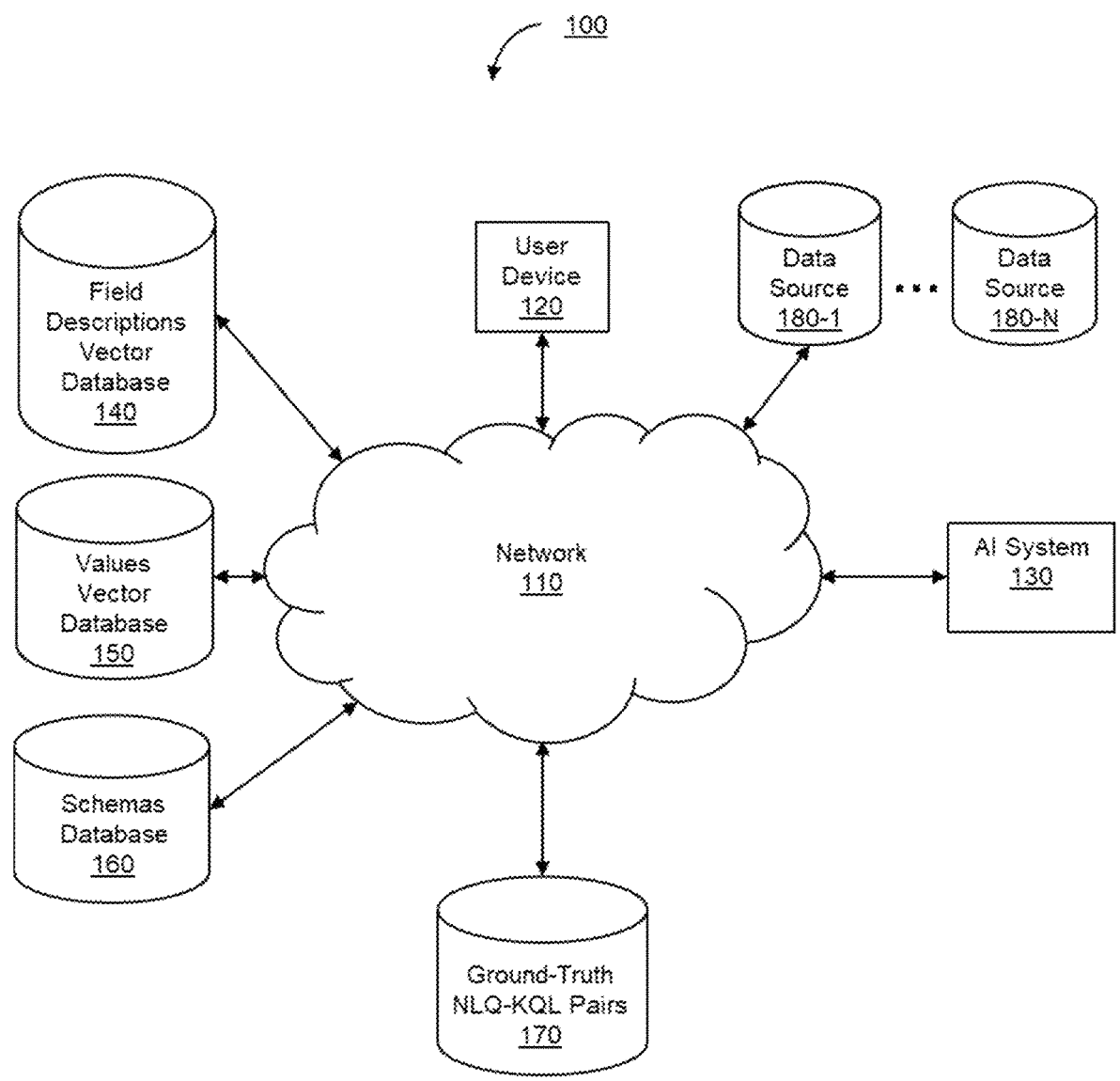
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments provide a system and method for a robust, real-time conversion of natural language queries into accurate KQL queries while ensuring high precision and correctness. The disclosed method and system consider the specific security logs of a user and are designed to minimize latency by utilizing low-dimensionality vector databases. Additionally, the disclosed method and system provides an operable NL2KQL translation functionality for a variety of Kusto databases used to store security logs containing a wide variety of database schema.

The disclosed method and system improve security operations by bridging the gap between human intent and structured query languages. The disclosed method and system further enable faster, more intuitive data analysis, empowering security teams to detect threats efficiently without requiring deep expertise in KQL.

The various disclosed embodiments employ Retrieval Augmentation Generation (RAG) techniques to enrich the context of LLM prompts to generate more precise KQL queries from a free text query. The RAG techniques include the generation and use of vector databases that store embeddings of the fields and values of logs as well as the schema of the logs. In the RAG techniques, free text queries are converted into vector embeddings and similarity searches are performed between the free text embeddings and the log embeddings to determine relevant fields and values of logs used to enrich the prompt for an LLM configured to generate KQL queries. The vector similarity searches as part of a RAG technique, according to various embodiments, achieve low latency by generating and using low-dimensionality vector databases as opposed to complex high-dimensionality vector databases.

Additionally, the schema of logs from various data sources are refined. This refinement takes highly complex, nested, and cumbersome schema and uses the relevant fields and values generated using vector similarity searching to narrow the schema the most pertinent elements of the schema. This refined schema is used to generate a prompt for an LLM that will reduce the response time and likelihood of hallucinations of the LLM.

With real-time query translation, low-latency responses, and intelligent prompt engineering, the disclosed NL2KQL solution allows for accurate, accessible, and effective cybersecurity analytics.

FIG. 1 is a network diagram 100 utilized to describe the various disclosed embodiments. In the example network diagram 100, a user device 120; an AI system 130; a variety of vector databases, including field descriptions vector database 140 and a values vector database 150; a schemas database 160; ground-truth NLQ-KQL pairs 170; and a plurality of data sources 180-1 through 180-N (hereinafter referred to individually as a data source 180 and collectively as data sources 180, merely for simplicity purposes) communicate via a network 110. The network 110 may be but is not limited to, a wireless, cellular, or wired network, a local area network (LAN), a wide area network (WAN), a metro area network (MAN), the Internet, the World Wide Web (WWW), similar networks, and any combination thereof.

The databases (including field descriptions vector database 14, values vector database 150, schemas database 160, and ground-truth NLQ-KQL pairs 170) may reside in the same or different physical locations, including on-premises infrastructure, cloud environments (public, private, or hybrid), or a combination thereof. Databases may be implemented as physical, virtualized, or logical entities. In some embodiments, they may be hosted on dedicated hardware; in others, they may be distributed across virtual machines, containers, or cloud-native services. Logical databases may span multiple physical resources, with the underlying infrastructure abstracted by orchestration or virtualization layers. The architecture may include centralized or distributed configurations, and databases may be relational, non-relational (e.g., NoSQL), graph-based, or otherwise structured to meet system requirements. Multiple database types and instances may be used concurrently, supporting various use cases and scalability needs.

The user device (UD) 120 may be but is not limited to, a personal computer, a laptop, a tablet computer, a smartphone, a wearable computing device, or any other device capable of receiving and displaying notifications. A user operating a user device 120 can submit a natural language query to the AI system 130.

Data sources 180 may store logs from various sources like firewalls, servers, applications, and network devices in an organization protected by AI system 130. Data sources 180 may further store or provide detailed reports and data for forensic analysis and/or alerts on cyber incidents. A data source 180 may include but is not limited to, SIEM tools, data lakes, data storage devices, and the like. Examples for data sources 180 include SIEM tools, such as Splunk® Enterprise Security, ArcSight by Micro Focus, LogRhythm, AlienVault, Microsoft® Sentinel, and the like.

A data source 180 may be realized as a data lake is a centralized repository for storing structured and unstructured data at any scale. Unlike traditional databases that store data in structured formats, a data lake can store raw data, which can be processed later according to different needs. The data stored in a data lake may include logs, incidents, and the like. A data source 180 may be a storage, such as a database including structured data, a cloud storage, and the like. Each data source of the data sources 180 may be provided by different vendors and, as such, may store different types of data in different formats.

AI system 130 generates descriptions of each field observed in the logs and converts the field descriptions into embeddings using a text embedding model. AI system 130 stores the embeddings of the field descriptions in a field descriptions vector database 140. AI system 130 extracts relevant values from each of the fields of the logs and stores corresponding text embeddings of the values in the values vector database 150.

In an embodiment, AI system 130 generates descriptions of each field using an AI-based search engine, such as, but not limited to, Tavily AI®. AI system 130 generates descriptions of the fields by using the AI-based search engine to gather relevant information on the fields from any official documentation available and other data sources, such as, but not limited to, web-based sources, APIs, or internal knowledge bases that provide insights about the field. In an embodiment, the AI-based search engine is applied to generate descriptions of fields of data by leveraging natural language understanding and content synthesis capabilities to interpret field names, infer semantic meaning, and produce contextually appropriate textual explanations. When provided with a field name, the system utilizes semantic parsing to analyze the linguistic structure of the field label, map the linguistic structure to known ontologies, and retrieve domain-relevant information from structured and unstructured sources.

The field descriptions vector database 140 and the values vector database 150 are low-dimensionality vector databases, thereby decreasing the latency of similarity searches performed using either vector database. In an embodiment, AI system 130 embeds natural language queries and performs similarity searches between the natural language embeddings and embeddings related to the fields and values of the logs.

AI system 130 generates a schema of the unstructured data of the logs and stores the generated schema in schema database 160. In an embodiment, the schema is generated by analyzing the data structures and data types within JavaScript® Object Notation (JSON) data and merging observations regarding the analyzed data structures and data types into a generalized schema. The schema is then updated recursively to reflect new fields and data types based on new data in the logs. This analysis and merging is performed using, for example, genson-rs, which is a high-performance library designed for generating a schema from JSON data, such as security logs.

AI system 130 refines generated schema. Refining the schema of the logs leverages the relevant fields and values of the logs that are identified through similarity searches with the text embedding of the NLQ. The refined schema contains the relevant fields and values. Using a refined schema in the LLM prompt decreases response time and reduces hallucinations of the LLM. Schema refinement is discussed in more detail below.

AI system 130 may utilize an LLM to generate a KQL query based on the NLQ inputted to AI system 130. AI system 130 may also validate the syntax of the KQL query outputted by the LLM. Inputs such as, but not limited to, the identified relevant fields and values of the fields as well as the refined schema are included in the prompt for the LLM. Prompting the LLM, executing the prompt by the LLM, and validating KQL query syntax are discussed in more detail below.

Ground-truth NLQ-KQL pairs 170 are generated and validated NLQ-KQL pairs. As users often repeat similar queries with slight modifications, generating and validating past ground-truth pairs of NLQ queries and KQL queries allows for referencing the ground-truth NLQ-KQL pairs 170 to improve the accuracy of similarity searches and the outputted KQL queries, according to various embodiments. In an embodiment, security analysts, such as threat-hunting experts and detection engineers, generate and validate a large set of NLQ-KQL pairs across various domains, use cases, and data sources.

It should be noted that AI system 130 can be deployed either in the cloud computing environment or on-premises, depending on the organization's needs, resources, and preferences. The cloud computing environment can be a public, private, or hybrid cloud. Examples of public cloud computing environments include Amazon® Web Services (AWS), Microsoft® Azure, or Google® Cloud Platform (GCP), which offer shared infrastructure managed by the cloud provider, providing scalability, flexibility, and reduced infrastructure management. On-premises deployment involves hosting AI system 130 on the organization's servers and infrastructure, giving the organization complete control over the environment but also requiring more management and maintenance effort. This option is often chosen for systems with strict security or compliance requirements.

It should be understood that the embodiments described herein are merely exemplary and not intended to be limiting. The arrangement illustrated in FIG. 1 is provided for illustrative purposes only and does not restrict the scope of the disclosed embodiments. Various modifications, adaptations, and alternative configurations may be implemented without departing from the spirit and scope of the disclosed embodiments.

Figure 2:
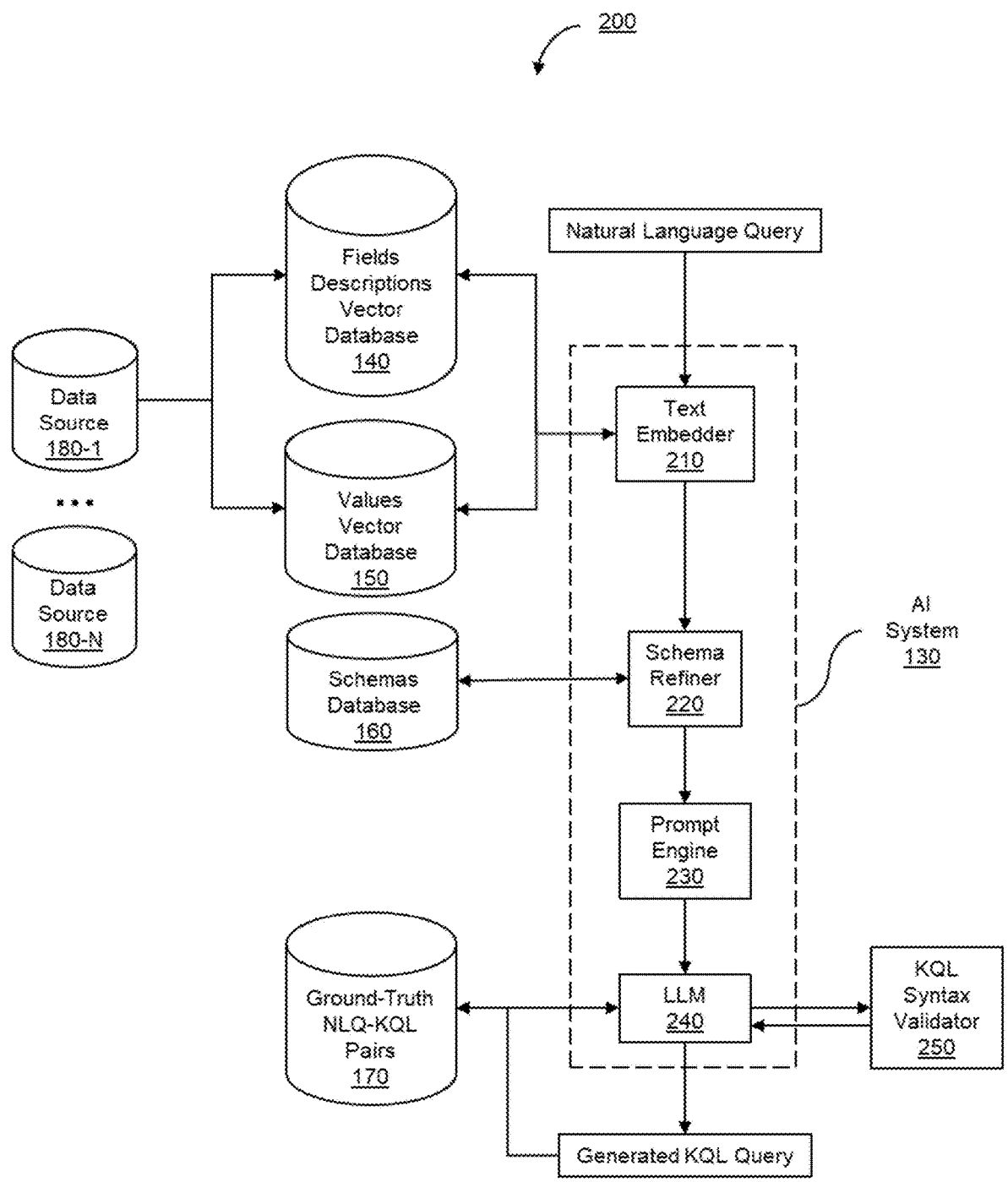
FIG. 2 is an example flow diagram for converting natural language queries to KQL queries according to an embodiment.

FIG. 2 is an example flow diagram 200 for converting natural language queries to KQL queries according to an embodiment. When a user provides a natural language query, LLMs are utilized with RAG to translate the input query into a KQL query. It should be noted that the RAG process is executed in real-time for each input query.

Logs are received from the data sources 180. The field descriptions of the logs are embedded in field descriptions vector database 140. The values of the fields of the logs are embedded in values vector database 150.

The field descriptions vector database 140 stores vector embeddings of descriptions of fields that are valid in a KQL query. Examples of such fields include, but are not limited to, "EventID", "DestinationIPType", and "eventName". Each field is paired with a textual description, which is encoded into a low-dimensionality embedding vector. The textual description is a generalized, semantically meaningful description. Storing such textual embeddings enables similar fields that have different names across different data sources to have the same description. For example, similar fields may have different field names such as "TargetUsername" and "UserPrincipalName" but the generalized textual description is, for example, "The identity of the user who initiated the action." Storing the embeddings of the generalized description of the fields in the field descriptions vector database 140 enables vector semantic similarity searches with embeddings of natural language descriptions of fields.

The values vector database 150 stores vector embeddings of values that reflect actual values in fields of the logs from a data source. As values within structured fields often exhibit syntactic variation despite representing the same underlying entity, the syntactically different values are embedded in a multi-dimensional feature space where value embeddings neighbor semantically similar value embeddings. For example, the name of an individual may appear as "Michael Smith" in one data source, "msmith@company.com" in another, and simply "msmith" or "Michael S." in a third. Similarly, an organization may be referred to as "Microsoft Corporation," "MSFT," "microsoft.com," or "MS Corp," depending on the context in which the data is logged. Geographic locations may be written as "United States," "USA," "U.S.," or "America." Role titles such as "System Administrator" might appear as "SysAdmin," "Admin," or "Root User," while authentication outcomes may be recorded as "Success," "Succeeded," "Login OK," or a status code such as "200." Storing embeddings for the syntactically different values that have similar semantic meaning enables vector similarity searches with embeddings of natural language value descriptions.

Text embedder 210 retrieves an NLQ. Text embedder 210 converts the NLQ into a text embedding and performs vector similarity searches between the embedded NLQ and the field descriptions embeddings from field descriptions vector database 140 and the values embeddings of the fields from the values vector database 150, respectively. In an embodiment, the functions of text embedder 210 are performed by AI system 130.

Schema refiner 220 refines generated schema. As explained above, refining schema of the logs leverages the relevant fields and values of the logs that are identified through similarity searches with the text embedding of the NLQ. The refined schema contains the relevant fields and values. Using a refined schema in the LLM prompt decreases response time and reduces hallucinations of the LLM. In an embodiment, the functions of schema refiner 220 are performed by AI system 130.

Prompt engine 230 is configured to generate a prompt for a generative AI model of LLM 240. For example, in an embodiment, the generated prompt includes an instruction to generate a KQL query based on the identified fields and values, NLQ, and the refined schema; a constraint based on a determined metric; a prompt template, a combination thereof; and the like. Including the refined schema, the identified fields, the identified values, and other inputs serves to enrich and augment the prompt to enable the LLM to generate the most relevant and accurate KQL query with respect to the NLQ. In an embodiment, the functions of prompt engine 230, included generating a prompt for a generative AI model, are performed by AI system 130.

LLM 240 is configured to execute the prompt generated by the prompt engine 230 to generate a KQL query by utilizing a generative artificial intelligence (AI) model. In an embodiment, the generative AI model includes a generative adversarial network (GAN), a general pre-trained transformer (GPT), a BART model, a LLaMa model, a language model (e.g., a large language model, a small language model, etc.), a multimodal generative AI, a combination thereof, and the like. In an embodiment, LLM is executed by AI system 130. In some embodiments, LLM 240 may be separate from AI system 130.

In an embodiment, text embedder 210, schema refiner 220, prompt engine 230, LLM 240, or a combination thereof, are included in AI system 130.

KQL syntax validator 250 retrieves the generated KQL query outputted by the LLM 240 and ensures the accuracy of the syntax of the generated KQL query by validating the KQL query against a KQL-based search engine.

It should be understood that the engines, modules, and components described in reference to FIG. 2 may be implemented in software, firmware, hardware, or any combination thereof. In embodiments where the engines are implemented in software, they may comprise instructions stored on a non-transitory computer-readable medium and executed by one or more processors to perform the described functions. The scope of the disclosed embodiments is not limited to any particular implementation, and various modifications, adaptations, and equivalent arrangements may be made without departing from the disclosed embodiments.

Figure 3:
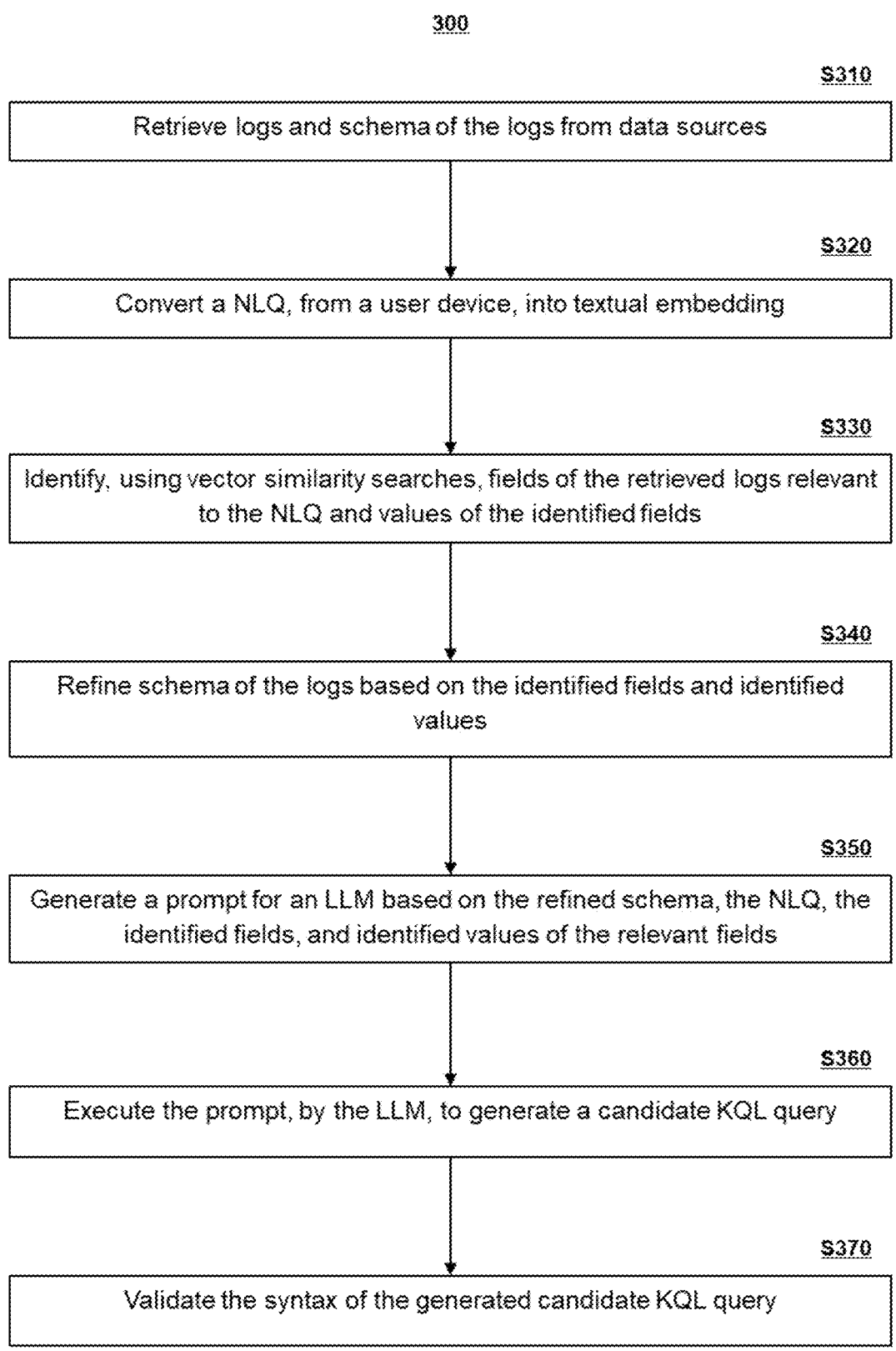
FIG. 3 is an example flowchart illustrating a process for converting NLQ to KQL queries.

FIG. 3 is an example flowchart 300 illustrating a process for converting NLQ to KQL queries. In an embodiment, the process is performed by AI system 130, FIG. 1.

At S310, the logs and schema of the logs are retrieved from data sources. Logs and schema of the logs are retrieved from various sources like firewalls, servers, applications, and network devices in an organization including data sources 180, FIG. 1.

At S320, the NLQ is converted into a text embedding. In an embodiment, the NLQ is embedded by text embedder 210, FIG. 2. NLQs are converted into text embeddings using models, such as but not limited to, GTE-base variant from the General Text Embeddings series. This model generates fixed-size embeddings of 768 dimensions, optimized for both semantic fidelity and computational efficiency. Each input string is individually transformed via the GTE-Base model into a 768-dimensional vector embedding. These embeddings are subsequently utilized in vector similarity operations to identify correlations or semantic relationships between user queries and log data entries, enabling efficient and intelligent retrieval and analysis of log-based information.

Text embeddings are a numerical representation of textual data wherein individual words, phrases, or documents are mapped to vectors in a continuous, high-dimensional vector space. This transformation is achieved via trained machine learning models, such as neural networks, which capture semantic relationships between textual elements based on usage of the textual elements. In the context of vector similarity search, these embeddings enable the comparison of textual inputs by computing distances or similarities (e.g., cosine similarity or Euclidean distance) between their respective vector representations.

The embedding process comprises tokenization of the input text, followed by vectorization using a pre-trained or fine-tuned embedding model (e.g., transformer-based architectures or word2vec variants). The resulting vectors are stored in an index structure optimized for efficient similarity queries, such as k-nearest neighbor (k-NN) search using approximate nearest neighbor (ANN) algorithms.

At S330, fields of the retrieved logs relevant to the NLQ and values of the identified fields are identified using vector similarity searches.

To identify the log fields that are most relevant to the NLQ, a similarity search is performed using a vector database that stores embeddings of the field descriptions of logs (e.g., field descriptions vector database 140, FIG. 1).

In an embodiment, GTE-Base from the General Text Embeddings series is utilized to generate embeddings of the field descriptions corresponding to structured fields within the log data.

In an embodiment, to ensure optimal retrieval, received fields are evaluated over ground-truth NLQ-KQL pairs. The number of fields identified is a number that is sufficient to cover the fields needed to generate, via an LLM, an accurate KQL query and that keeps the context size of the prompt for the LLM sufficiently small, balancing accuracy of output and reduced latency.

According to an embodiment, semantic similarity is determined utilizing cosine similarity, Euclidean distance, Manhattan distance, KL divergence, a combination thereof, and the like.

In some embodiments, semantic similarity is determined based on a word embedding model, such as Word2Vec, GloVe, and the like. In certain embodiments, semantic similarity is determined by utilizing a contextual embedding model, such as a bidirectional encoder representation from the transformer (BERT) model, a generative pre-trained transformer (GPT) model, and the like.

To identify relevant values of the relevant log fields respective of the content of the NLQ, a similarity search is performed using, for example, but not limited to, cosine similarity in vector database that stores embeddings of the values of log fields (e.g., values vector database 140, FIG. 1). In an embodiment, GTE-base from the General Text Embeddings series is utilized to generate embeddings of the values of the data entries in the relevant fields.

As logs often contain dynamic values (e.g., specific usernames and IP addresses), the relevant values that result from the similarity search are utilized to enhance and augment the prompt, configured to be executed by an LLM. In an embodiment, the value embeddings are embeddings of actual values from the logs retrieved at S310. It should be noted that providing actual values makes it possible for the LLM to generate precise KQL queries with filters that are relevant to the retrieved log data.

For example, when a user sends a NLQ such as, "Show me errors from the authentication service in the last 24 hours," the NLQ is embedded, and a field similarity search is performed first to identify fields that are relevant to the NLQ. For an enterprise that collects application telemetry in a centralized logging table referred to as, "AppLogs," the table may contain fields such as, but not limited to, a timestamp indicating when the log entry was recorded, a log level indicating the severity of the event, the name of the service that produced the log, the name of the operation being executed, and a message string describing the event. These fields may be the result of the field similarity search.

Based on the NLQ, a value similarity search is performed to identify values from these fields that are relevant to NLQ. The fields in the enterprise's log data may contain values such as, but not limited to, known service names like, "AuthService," or "UserProfileService;" operation names such as, but not limited to, "Login" or "GetUserDetails;" and log levels such as, but not limited to, "Error" or "Warning." These values may be the result of the value similarity search.

The identified fields and identified values are retrieved to enrich the prompt. As a result, the LLM, as described in more detail below, is configured to generate a KQL query that includes filters tailored to the actual structure and content of the retrieved logs. In this example, the generated KQL query may filter for log entries where the timestamp is within the past 24 hours, the log level is set to "Error", and the service name matches "AuthService."

In some embodiments, previously executed and validated queries are referenced. A set of historically successful KQL queries are retained within a vector database. Each query is embedded into a high-dimensional vector space using one or more natural language or semantic embedding models, facilitating similarity comparison based on vector proximity. To enable efficient and scalable retrieval of similar queries in real time, a Hierarchical Navigable Small World (HNSW) is utilized as an ANN algorithm. The HNSW algorithm structures the embedded vectors into a multi-layer navigable small-world graph, where each node represents a stored query and maintains connectivity with neighboring nodes that are semantically similar. This graph-based architecture significantly reduces search complexity by enabling logarithmic-time traversal through the index, thereby optimizing real-time query processing. In an additional embodiment, the retrieval of historically successful KQL queries utilizes a recall-oriented approach, prioritizing the identification of a comprehensive set of relevant prior queries over exact query matches. The continuous updating of the vector database with new user-approved queries further supports adaptive learning and refinement of the search model over time.

At S340, the schema of the logs are refined based on the identified fields and identified values. In an embodiment, the schema is refined by schema refiner 220, FIG. 2.

As explained above, refining schema of the logs leverages the relevant fields and values of the logs that are identified through similarity searches with the text embedding of the NLQ. The refined schema contains the relevant fields and values.

At S350, a prompt, for an LLM, including at least the refined schema, the NLQ, and the identified fields and identified values is generated. In an embodiment, the prompt is generated by prompt engine 230, FIG. 2.

In an embodiment, the prompt is generated for a generative AI model. For example, in an embodiment, the generated prompt includes an instruction to generate a KQL query based on the identified relevant fields and values, NLQ, and the refined schema; a constraint based on a determined metric; a prompt template, a combination thereof; and the like.

At S360, the prompt is executed by the LLM to generate a candidate KQL query. In an embodiment, the prompt is executed by LLM 240, FIG. 2. When the prompt is executed by the LLM, a candidate KQL query is generated. In an embodiment, a generative AI model is utilized, which is defined above.

At S370, the syntax of the generated candidate KQL query is validated. In some embodiments, validating KQL queries utilizes an official KQL parser library to analyze the syntactic and semantic correctness of the generated KQL queries based on the refined schema. Upon detection of errors, such as malformed syntax or invalid references to schema elements, issues are detected and flagged. Additionally, errors are automatically repaired to ensure a performant KQL query. This validation and repair ensures that the final KQL query is both syntactically valid and semantically aligned with the underlying data schema, enhancing the reliability and usability of LLM-generated queries in production environments.

In an embodiment, validating and repairing the semantics and syntax of the generated KQL query is performed by a syntax validation module (e.g., KQL syntax validator 250, FIG. 2).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
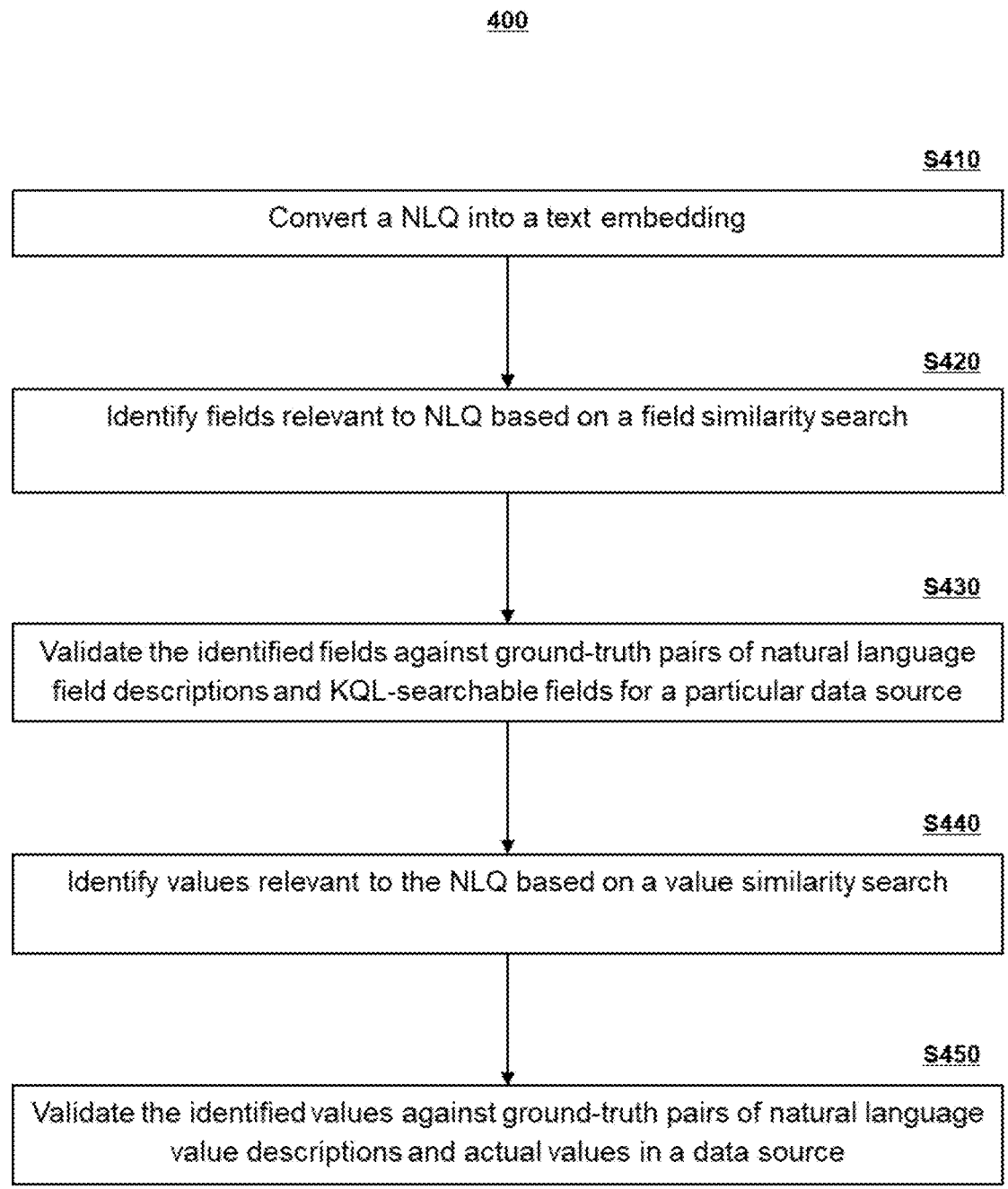
FIG. 4 is an example flowchart of a process for identifying fields and values according to an embodiment.

FIG. 4 is an example flowchart 400 of a process for identifying fields and values according to an embodiment. In an embodiment, fields that are most relevant to an NLQ and values of those fields that exist in the log data are identified. The identified fields and values are used, for example, as part of an RAG process, to augment the prompt of an LLM, which configures the LLM to generate the most relevant KQL to the NLQ based on the actual values of the fields.

At S410, an NLQ is converted into a text embedding. In some embodiments, the NLQ is converted into a text embedding using models, such as but not limited to, GTE-base variant from the General Text Embeddings series of models, as explained above. In an embodiment, the NLQ includes a request, based on some criteria, to search values in log data.

At S420, log fields relevant to the NLQ are identified based on a field similarity search. The field similarity search is based on a similarity search between the embedding of a natural language field description in the NLQ and embeddings of field descriptions for field names for a KQL query that is performant on a particular data source. For example, the names of the fields that include values pertaining to monitored events may be "EventType" in one data source, "Activity" in another data source, "eventName" in a third data source. An embedding of a natural language field description in the NLQ is used, through vector semantic similarity searching, to identify an embedding of a field name that is most similar to the field description embedding from the NLQ. The embedding of a field name that is most similar to the field description embedding represents the field that is most relevant to the NLQ.

To identify the log fields that are most relevant to the NLQ, a similarity search is performed using a vector database that stores embeddings of the field descriptions of logs (e.g., field descriptions vector database 140, FIG. 1). According to an embodiment, semantic similarity is determined utilizing cosine similarity, Euclidean distance, Manhattan distance, KL divergence, a combination thereof, and the like.

In an embodiment, GTE-Base from the General Text Embeddings series is utilized to generate embeddings of the field descriptions corresponding to structured fields within the log data. In some embodiments, semantic similarity is determined based on a word embedding model, such as Word2Vec, GloVe, and the like. In certain embodiments, semantic similarity is determined by utilizing a contextual embedding model, such as a bidirectional encoder representation from transformer (BERT) model, a generative pre-trained transformer (GPT) model, and the like.

At S430, the identified fields are validated against ground-truth pairs of natural language field descriptions and KQL-searchable fields for a particular data source.

In some embodiments, the identified fields include at least one relevant field name. As in the above example at S420, the at least one relevant field name for an NLQ may be, but is not limited to, "EventType," "Activity," and "eventName." For each field name identified as relevant to the NLQ, a validation is performed against a ground-truth pair, from a labeled dataset, that includes a same or similar NLQ and a corresponding field name that, when used in a KQL query, is performant on a particular data source. As in the previous example, the validation may result in, for example, "eventName" field as a field name that is KQL-searchable in the particular data source based on the NLQ. The accuracy of the field name is validated based on correspondence with the ground-truth field name using, but not limited to, exact match, top-N recall, a defined similarity threshold, a combination thereof, and the like.

At S440, values relevant to the NLQ are identified based on a value similarity search. The value similarity search is based on a vector similarity search between the embeddings of the actual values used in a particular data source for the identified fields and the embeddings of a natural language description of values used in the NLQ.

A value embedding representing a natural language value description in the NLQ is used, through vector semantic similarity searching, to identify an embedding of a value that is most similar to the value embedding in the NLQ. The embedding of a value that is most similar to the value embedding represents the value that is most relevant to the NLQ. According to the example where "eventName" is validated for a given NLQ as a KQL-searchable field, the values that are identified as relevant for the given NLQ may be "Login," "DeviceLogin," and "ConsoleLogin."

A similarity search is performed using, for example, but not limited to, cosine similarity in vector database that stores embeddings of the values of log fields (e.g., values vector database 140, FIG. 1). In an embodiment, GTE-base from the General Text Embeddings series of models is utilized to generate embeddings of the values of the data entries in the relevant fields.

The values that are identified through the value similarity search are utilized to enhance a prompt, configured to be executed by an LLM. It should be noted that providing actual values for the identified relevant fields makes it possible for the LLM to generate precise KQL queries with filters that are relevant to the retrieved log data.

At S450, the identified values are validated against ground-truth pairs of natural language value descriptions and actual values in a data source.

In some embodiments, the identified values includes at least one relevant value. As in the above example at S440, the at least one relevant value for an NLQ may be, but is not limited to, "Login," "DeviceLogin," and "ConsoleLogin." For each value identified as relevant to the NLQ, a validation is performed against a ground-truth pair, from a labeled dataset, that includes a same or similar NLQ and a corresponding value that, when used in a KQL query, is performant on a particular data source. As in the previous example, the validation may result in, for example, the "ConsoleLogin" value as the KQL-searchable value for the particular data source based on the NLQ. The accuracy of the identified relevant value is validated based on correspondence with the ground-truth value using, but not limited to, exact match, top-N recall, a defined similarity threshold, a combination thereof, and the like.

Validating a field name and a value that are each relevant to the NLQ and are both KQL-searchable for a particular data source enables the enrichment of such field names and values into a prompt for an LLM that is configured to generate a KQL query using such field names and values that corresponds to the intent of the NLQ. Such a generated KQL query, given the prompt that is enriched with the validated field names and values, is configured to be operable on a particular data source. This reduces the number of errors in a KQL query that makes the query inoperable.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
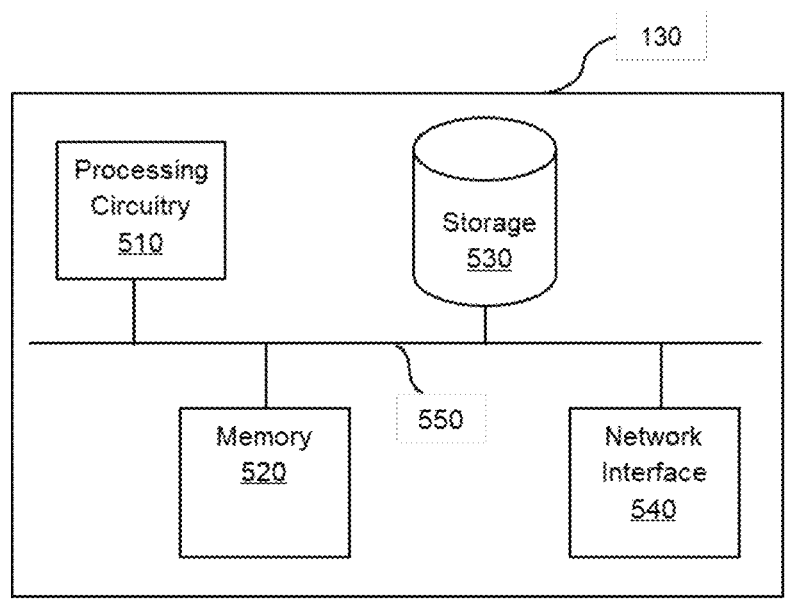
FIG. 5 is an example schematic diagram of an AI system according to an embodiment.

FIG. 5 is an example schematic diagram of an AI system 130 according to an embodiment. The AI system 130 is a compute device that includes, according to an embodiment, a processing circuitry 510 coupled to a memory 520, a storage 530, and a network interface 540. In an embodiment, the components of the AI system 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In at least some embodiments, the processing circuitry 510 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 510 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 510 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 510 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 510 may include a number of CPU cores which is equal to or greater than the number of GPUs in order to facilitate or otherwise support parallel processing via multiple GPUs.

In an embodiment, the memory 520 is a volatile memory (e.g., random access memory, etc.), a non-volatile memory (e.g., read-only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the AI system 130 with communication with, for example, the user device 120, the field descriptions vector database 140, the values vector database 150, schemas database 160, ground-truth NLQ-KQL pairs 170, data sources 180, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or certain devices and/or a combination of devices. The application program may be uploaded to, and executed by, a machine comprising any suitable architecture. Preferably, the machine is implemented on a computer platform having hardware such as one or more processing units (PUs), a memory, and input/output interfaces. The computer platform may also include an operating system and micro-instruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for querying data sources for cybersecurity analysis, comprising:
    identifying, by a device, fields of security logs that are relevant to a natural language query;
    computing, by the device, values for the identified fields based on actual values contained in the identified fields;
    refining, by the device, a schema of the security logs to include the identified fields and the computed values;
    generating, based on at least the refined schema, a prompt for a Large Language Model (LLM), wherein the LLM is executed by an AI system;
    feeding the prompt to the LLM, wherein the LLM executes the prompt using the AI system, to convert the natural language query into a Kusto Query Language (KQL) query; and
    generating a KQL query that is executed on at least one target data source.

2. The method of claim 1, further comprising:
    converting, using a text embedding model, the natural language query into a text embedding; and
    storing the text embedding representing the natural language query in a multi-dimensional feature space.

3. The method of claim 1, wherein identifying fields of security logs that are relevant to the natural language query further comprises:
    generating a natural language description of each field;
    embedding a feature vector for the natural language description of each field in a multi-dimensional feature space;
    performing a field vector similarity search between a feature vector representing the natural language query and each feature vector representing the natural language descriptions of each field;
    identifying at least one field for which the feature vector is below a semantic distance threshold from the feature vector representing the natural language query; and
    validating the at least one field against ground-truth pairs of natural language field descriptions and KQL-searchable fields for at least one target data source.

4. The method of claim 3, wherein computing values for the identified fields based on actual values contained in the identified fields further comprises:
    embedding a feature vector for a natural language description of each possible value of each field in a multi-dimensional feature space;
    performing a value vector similarity search between the feature vector representing the natural language query and each feature vector representing the natural language descriptions of each possible value of each field;
    identifying at least one value for which the feature vector is below a semantic distance threshold from the feature vector representing the natural language query; and
    validating the at least one value against ground-truth pairs of natural language value descriptions and actual values in the at least one target data source.

5. The method of claim 3, wherein generating the natural language descriptions of the fields further comprises:
    generating the natural language descriptions using an AI-based search engine, wherein the AI-based search engine gathers relevant information on the fields from official documentation and other available data sources.

6. The method of claim 1, further comprising:
    validating a syntax of the generated KQL query.

7. The method of claim 1, wherein refining the schema of the security logs to include the identified fields and the computed values further comprises:
    narrowing the schema to the most pertinent elements of the schema based on the identified fields and the computed values.

8. The method of claim 1, further comprising vector similarity searches, wherein the vector similarity searches further comprise:
    constructing a fields description vector database and a values vector database, wherein each vector database includes a multi-dimensional vector space of a relatively low-dimensionality.

9. The method of claim 1, wherein KQL is a language to query any one of: structured data, semi-structured data, and unstructured data.

10. The method of claim 1, wherein a KQL query is a read-only request to process data stored hierarchically in databases, tables, and columns.

11. A system for querying data sources for cybersecurity analysis comprising:
    a processing circuitry;
    a memory, the memory containing instructions that, when executed by the processing circuitry, configure the system to:
    identify, by a device, fields of security logs that are relevant to a natural language query;
    compute, by the device, values for the identified fields based on actual values contained in the identified fields;
    refine, by the device, a schema of the security logs to include the identified fields and the computed values;
    generate, based on at least the refined schema, a prompt for a Large Language Model (LLM), wherein the LLM is executed by an AI system;
    feed the prompt to the LLM, wherein the LLM executes the prompt using the AI system, to convert the natural language query into a Kusto Query Language (KQL) query; and
    generate a KQL query that is executed on at least one target data source.

12. The system of claim 11, wherein the memory contains further instructions which when executed by the processing circuitry further configure the system to:
    convert, using a text embedding model, the natural language query into a text embedding; and store the text embedding representing the natural language query in a multi-dimensional feature space.

13. The system of claim 11, wherein the memory contains further instructions that, when executed by the processing circuitry for identifying fields of security logs that are relevant to the natural language query, further configure the system to:
generate a natural language description of each field;
embed a feature vector for the natural language description of each field in a multi-dimensional feature space;
perform a field vector similarity search between a feature vector representing the natural language query and each feature vector representing the natural language descriptions of each field;
identify at least one field for which the feature vector is below a semantic distance threshold from the feature vector representing the natural language query; and
validate the at least one field against ground-truth pairs of natural language field descriptions and KQL-searchable fields for at least one target data source.

14. The system of claim 13, wherein the memory contains further instructions that, when executed by the processing circuitry for computing values for the identified fields based on actual values contained in the identified fields, further configure the system to:
embed a feature vector for a natural language description of each possible value of each field in a multi-dimensional feature space;
perform a value vector similarity search between the feature vector representing the natural language query and each feature vector representing the natural language descriptions of each possible value of each field;
identify at least one value for which the feature vector is below a semantic distance threshold from the feature vector representing the natural language query; and
validate the at least one value against ground-truth pairs of natural language value descriptions and actual values in the at least one target data source.

15. The system of claim 13, wherein the memory contains further instructions that, when executed by the processing circuitry for generating the natural language descriptions of the fields, further configure the system to:
generate the natural language descriptions using an AI-based search engine, wherein the AI-based search engine gathers relevant information on the fields from official documentation and other available data sources.

16. The system of claim 11, wherein the memory contains further instructions which when executed by the processing circuitry further configure the system to:
validate a syntax of the generated KQL query.

17. The system of claim 11, wherein the memory contains further instructions that, when executed by the processing circuitry for refining the schema of the security logs to include the identified fields and the computed values, further configure the system to:
narrow the schema to most pertinent elements of the schema based on the identified fields and the computed values.

18. The system of claim 11, wherein the memory contains further instructions which when executed by the processing circuitry further configure the system to:
construct a fields description vector database and a values vector database, wherein each vector database includes a multi-dimensional vector space of a relatively low-dimensionality.

19. The system of claim 11, wherein KQL is a language to query any one of:
structured data, semi-structured data, and unstructured data.

20. The system of claim 11, wherein a KQL query is a read-only request to process data stored hierarchically in databases, tables, and columns.

21. A non-transitory computer-readable medium storing a set of instructions for querying data sources for cybersecurity analysis, the set of instructions comprising:
one or more instructions that, when executed by one or more processing circuitries of a device, cause the device to:
identify, by the device, fields of security logs that are relevant to a natural language query;
compute, by the device, values for the identified fields based on actual values contained in the identified fields;
refine, by the device, a schema of the security logs to include the identified fields and the computed values;
generate, based on at least the refined schema, a prompt for a Large Language Model (LLM), wherein the LLM is executed by an AI system;
feed the prompt to the LLM, wherein the LLM executes the prompt using the AI system, to convert the natural language query into a Kusto Query Language (KQL) query; and
generate a KQL query that is executed on at least one target data source.

* * * * *